(12) United States Patent
Tylutki

(10) Patent No.: US 7,783,453 B2
(45) Date of Patent: Aug. 24, 2010

(54) METHOD, COMPUTER PROGRAM PRODUCT, AND SYSTEM FOR RAPID RESULTANT ESTIMATION PERFORMANCE DETERMINATION

(75) Inventor: Marcus Aurelius Tylutki, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 11/846,418

(22) Filed: Aug. 28, 2007

(65) Prior Publication Data

US 2009/0063096 A1    Mar. 5, 2009

(51) Int. Cl.
G06F 11/30    (2006.01)
G06F 19/00    (2006.01)

(52) U.S. Cl. ............... 702/182; 702/183; 702/184; 702/185

(58) Field of Classification Search ......... 702/182–189, 702/121–123
See application file for complete search history.

(56) References Cited

U.S. PATENT DOCUMENTS 6,035,277 A * 3/2000 Anbil et al. .................. 705/8
6,240,324 B1    5/2001 Preska et al.
6,792,443 B2    9/2004 Tang
2003/0218818 A1    11/2003 Bement et al.
2004/0202136 A1    10/2004 Attar et al.
2005/0185541 A1    8/2005 Neuman
2006/0067503 A1    3/2006 Caugherty et al.
2006/0234638 A1    10/2006 Mueckenheim et al.

FOREIGN PATENT DOCUMENTS

WO    9842089 A2    9/1998

* cited by examiner

*Primary Examiner*—Hal D Wachsman
*Assistant Examiner*—Phuong Huynh
(74) *Attorney, Agent, or Firm*—Caesar, Rivise, Bernstein, Cohen & Pokotilow, Ltd.

(57) ABSTRACT

The present invention provides a method, system and computer program product for rapidly determining a resultant in relation to a plurality of predetermined performance characteristics using a method for determining test values in exponential and binary processes which are sequentially and comparatively assessed in relation to one or more maximum performance constraints (MPC) of a set of predetermined performance characteristics.

7 Claims, 2 Drawing Sheets

200

METHOD, COMPUTER PROGRAM PRODUCT, AND SYSTEM FOR RAPID RESULTANT ESTIMATION PERFORMANCE DETERMINATION

FIELD OF THE INVENTION

The present invention relates generally to optimal iterative performance determination, and more specifically to providing a method for rapidly determining a resultant in relation to one or more performance criteria.

BACKGROUND OF THE INVENTION

In attempting to determine results in experiments, capacity sizing, predictive determination, and the like, often an iterative step approach is used to seek intermediate results for a given set of performance criteria. This iterative approach often involves having a set of predetermined characteristics or determinants, a step function with a predetermined interval step, a suite of established performance metrics, and a formula for estimating a result using some of the aforementioned determinants. Other examples in need of complex methodological results may include complex, possibly unsolvable, or difficult to solve equations and systems of which their inverses may be challenging or likely impossible to solve.

In practice however, attempting to solve an equation, process, algorithm or unknown using a given step approach is lengthy and may often consume valuable processing time, particularly for complex problems. Particularly in complex areas involving capacity sizing and research and development (R&D) estimation for instance, an iterative process typically provides a result that is not only an estimation but is often an inaccurate estimated result as well. In part, one reason for this inaccuracy is that a solution is determined only after an interval calculation "steps over" or exceeds one or more of the test guidelines thereby providing a result that is equivalent to the interval value of the iteration before the guidelines are exceeded.

Therefore, what is needed is a method of more rapidly determining a more accurate estimated resultant for one or more of a given set of performance criteria.

SUMMARY OF THE INVENTION

The present invention addresses such a need and sets forth a method of more rapidly determining a more accurate estimated resultant for a given set of one or more performance criteria using sequential processes that accelerate intermediary estimations of resultants in relation to performance criteria to achieve a final estimated result.

In one implementation, the present invention is a method for rapidly determining a resultant in relation to one or more predetermined performance characteristics. The method comprising: defining said one or more performance characteristics, initiating a first process for determining and storing a first test value and an associated intermediate resultant value; calculating and storing one or more subsequent test values and their associated subsequent intermediate resultant values, until one of a intermediate resultant value or a subsequent intermediate resultant value associated with its respective test value or subsequent test value, exceeds at least one performance characteristic; and, initiating a second process for determining and storing at least one binary test value and an associated intermediate binary resultant value, comparing the binary resultant value with the identified performance characteristic in accordance with one or more predetermined rules, and, determining a resultant in relation to a test value, an associated binary resultant value, the identified performance characteristic and at least said one or more predetermined rules.

In another implementation, the present invention is a method for rapidly determining a resultant in relation to one or more performance characteristics and a load factor with regard to intermediary values determined by the method of the present invention.

In a further implementation, the present invention is computer readable medium containing program instructions for rapidly determining one or more resultants in relation to a plurality of predetermined performance characteristics.

DETAILED DESCRIPTION

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention sets forth a unique method for rapidly determining a resultant in relation to a plurality of predetermined performance characteristics in staged steps including an exponential process and a binary process. In one or more implementations of the present invention, a maximum value is optimally determined in relation to one or more performance criteria in part by determining the largest iterative values within the method of the present invention.

Figure 1:
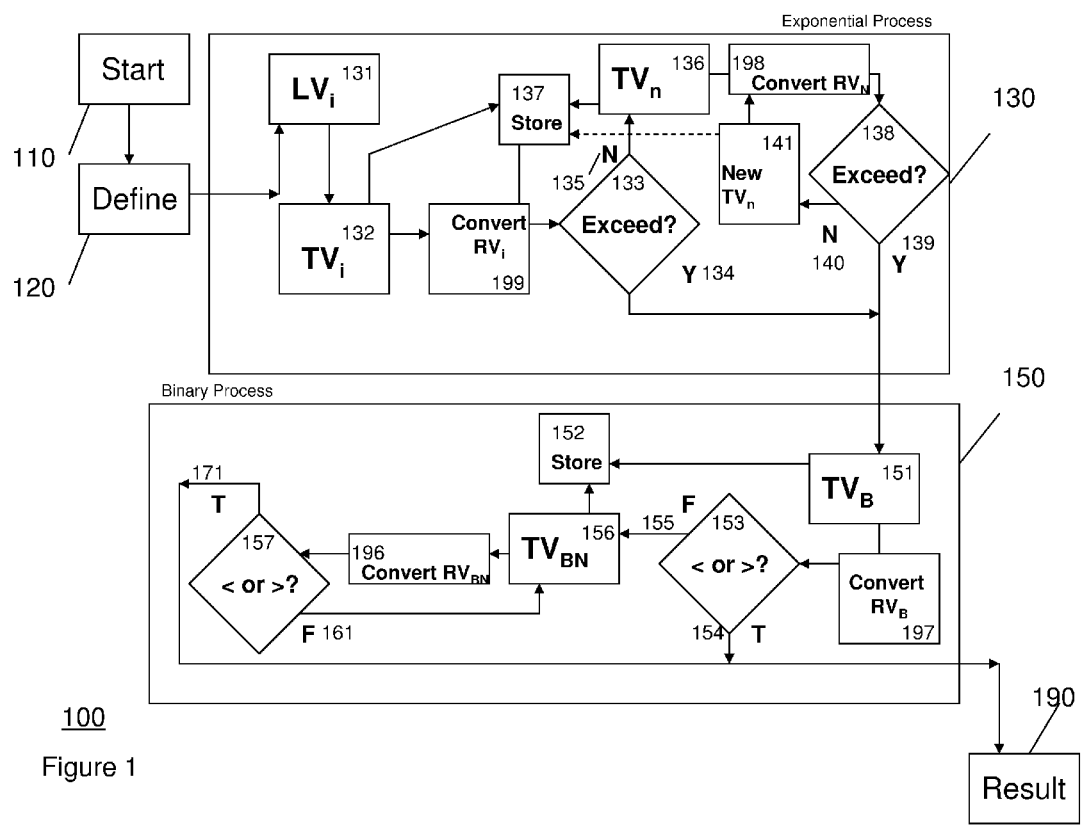
FIG. 1 depicts a flowchart of an implementation of the present invention.

FIG. 1 depicts a flowchart 100 of an implementation of the present invention. In FIG. 1, a process is instantiated at 110 and predetermined performance characteristics are defined at 120. Examples of predetermined performance characteristics may include but are not limited to load value (LV), a maximum performance constraint (MPC), a step size (SS), load factor (LF), acceleration percentage, expected target value (ETV), and the like. For instance, the following terms may better define further examples of the types of performance characteristics: (1) a load value may be an initial burden or load that is determined as a starting point in the analysis; (2) a MPC may be a maximum performance objective or value that the analysis may not exceed or guidelines for parameters which may cause the analysis to overstep or be exceeded; additionally, as used herein, a MPC may be determined directly, indirectly or in relation to invariants for a process, which may be different for one or more invocations of a particular process or sub-process, and as such the notation of MPC may refer to one or more dependencies to a MPC; (3) a SS may be an interval value similar to that of a traditional interval based testing process, or it may also be a predetermined error value (i.e., epsilon, ε) that predetermining the precision of the result, as it is intended to be used interchangeably herein; (4) a LF may be a factor applied to the LV or a multiple of the LV to be considered during evaluation; (5) an acceleration percentage may be a range or a value where additional accelerated procedures could occur in the process of the present invention; and, (6) an ETV may be a predetermined estimation of a likely solution, an optimal value, or result which may be used to adaptively accelerate the process of the present invention even further.

Once the predetermined characteristics are defined, the present invention initially performs an exponential process at 130 and then a binary process at 150. Once the two processes (130, 150) are complete, a result (i.e., solution) is determined at 190.

In the exponential process 130, an initial load value ($LV_I$) is determined at 131 in direct relation to the predetermined performance characteristics, where if no load value is provided as a predetermined performance characteristic, a default of 1 is preferably set forth. From the initial load value, an initial or first test value ($TV_I$) is determined at 132 in accordance with:

$$(TV_I) = (LV_I) \cdot SS. \tag{1}$$

The test value is stored at 137. The first test value is to be indirectly compared in relation to one or more MPCs. The $TV_I$ determined at 132 is converted to an intermediate resultant value ($RV_I$) at 199. As used herein, the terms "resultant value" and "RV" are values that may be determined abstractly, by formula(e), by function, or by predefined or predetermined methods such as but not limited to a system of equations. Additionally, as used herein, the terms "resultant value" and "RV" are terms that may be used interchangeably, be of one or more values, comprise one or more sets of values, and may consist of values which are separately compared with one or more MPCs, separately in or relation to one another, such that the terms should be read to include the plural of multiple values or one or more sets of values herein. The terms term "resultant value" and "RV" are not intended to be restricted to a single or singular value.

The $RV_I$ is then compared with the one or more MPCs at 133 (though a specific MPC type is not required for the present invention based on the MPC definition as used herein, a MPC value, abstract or otherwise, is needed), where if the $RV_I$ exceeds the value of the one or more MPCs (at 134) then the binary process is initiated.

If the $RV_I$ does not exceed the value of the one or more MPCs (at 135), then a next test value (i.e., a test value which follows the first; $TV_N$) is determined at 136. The next test value is determined in accordance with:

$$(TV_N) = (LV_I) \cdot LF. \tag{2}$$

The next test value (i.e., as used at this stage it is the present test value) is stored at 137. The $TV_N$ determined at 136 is converted to an intermediate resultant value ($RV_N$) at 198. The $RV_N$ is then compared with the one or more MPCs at 138, where if the $RV_N$ exceeds the value of the one or more MPCs (at 139) then the binary process is initiated. If the $RV_N$ does not exceed the value of the one or more MPCs (at 140), then a further next test value (i.e., a test value which follows the present one; a new $TV_N$ or $TV_{N+1}$) is determined at 141. The newly determined next test value of 141 is then converted to an intermediate resultant value ($RV_N$) at 198, where it is assessed and compared in relation to the one or more MPCs at 138. If the new $RV_N$ exceeds the value of the one or more MPCs (at 139) then the binary process is initiated. If the new $RV_N$ does not exceed the value of the MPC (at 140), then a further new next test value is determined and the process continues to newly determine a $TV_N$ value and corresponding $RV_N$ until the value exceeds the one or more MPCs of 138 so as to begin the binary process through 139.

Once a $RV_N$ is determined which exceeds the one or more MPCs at 138 the corresponding $TV_N$ is known, and a binary process is initiated from 139 and a first binary test value ($TV_B$) is determined at 151 in accordance with:

$$(TV_B) = ((TV_N) + (TV_{N-1}))/2. \tag{3}$$

The binary test value is equal to the average of the last test value in the exponential process which did not exceed the one or more MPCs (i.e., ($TV_{N-1}$)) and the sequentially following (i.e., subsequent) test value which did exceed the one or more MPCs (i.e., ($TV_N$)). The determined binary test value at 151 is then stored at 152.

The binary test value of 151 is converted to an intermediate binary resultant value ($RV_B$) at 197, which is then compared in relation to the one or more MPCs at 153. At 153, a variety of comparisons may be performed in varied implementations where the binary test value is compared to one or more MPCs in relation to the type of MPC and an associated comparative assessment.

For instance, in one implementation, at 153, if the $RV_B$ of 197, when compared to the one or more MPCs at 153 in accordance with:

$$|(MPC) - (RV_B)| \leq \epsilon \tag{4a}$$

is true, then the associated ($TV_B$) is determined to be the result value (190) for the analysis at 154. If equation 4a is false, at 153, then a new binary test value is to be determined at 156 along one of two paths, 155a, or 155b. The new binary test value is determined in accordance with the value of the binary resultant value $RV_B$ in relation to the one or more MPC values. For instance, there may be one MPC value to be compared with or there may be a plurality of MPC values to compare with, depending on the implementation. Additionally, during the comparison step, an assessment may be set to determine whether only one MPC fails or whether all MPCs fail in relation to the testing. For the implementation, the determination of a new binary test value at 156 is performed along 155a or 155b where equation 4a is not satisfied (i.e., false), and in accordance with formula 4b, such that:

If ($RV_B$)>MPC for at least one MPC, then (($TV_{BN+1}$)= ((($TV_{BN}$)+($TV_H$))/2) for 155a path and If ($RV_B$)< or =MPC for all MPCs, then (($TV_{BN+1}$)= ((($TV_{BN}$)+($TV_L$))/2), for 155b path, where $TV_H$ is defined to be the highest value of a previous test value ($TV_N$ or $TV_{BN}$) which did not exceed a MPC, and $TV_L$ is defined to be the least value of a previous test value ($TV_N$ or $TV_{BN}$), which exceeded a MPC. (4b)

At 156, a new binary test value has been determined in direct relation to the output of 153 along one of 155a or 155b.

Once the new binary test value is determined, a comparison is performed at 195 to determine whether the prior determined $TV_L$ value (stored at 152) is within the predetermined acceptable limits (i.e., within $\epsilon$) such that no further resultant values are to be determined. For instance, in one implementation, the new binary test value is compared with the $\epsilon$ and $TV_L$ value in accordance with:

$$|(TV_{BN}) - (TV_L)| \leq \epsilon \tag{4c}$$

where if equation 4c is true, $TV_L$ is returned as the final resultant (190) at 194 as further iteration would yield a test value that is less than epsilon and is within a predetermined range of accuracy, and if equation 4c is false, then a further associated resultant value is determined at 196.

In the event where equation 4c is false at 195, the new binary test value is converted to a binary resultant value ($RV_{BN+1}$) at 196 and is then compared to the one or more MPCs at 157 in accordance with equation 4a, which is a repeatable comparative process that continues until a new resultant value associated with its corresponding binary test value exceeds the one or more MPCs of equation 4a (such as an optimal value).

For an implementation, if the ($RV_{BN+1}$) when analyzed at 157 by using equation 4a shows that |(MPC)−($RV_{BN+1}$)|<ϵ is true, then the associated ($TV_{BN+1}$) is determined to be the resultant value (190) for the analysis at 157, with an outcome at 171. If equation 4a is determined to be false in view of ($RV_{BN+1}$), at 157, the outcome is 161 and a new binary test value is set forth in accordance with the value of the binary resultant value ($RV_{BN+1}$) in relation to the one or more MPC values and equation 4b. The determination of a new binary test value is performed in accordance with formula 4b at 156 for the new ($TV_{BN+1}$), which is then stored at 152, before the associated ($RV_{BN+1}$) is compared with the one or more MPCs at 157. The process continues until equation 4a is found to be true, wherein the difference between the MPC and the TV (and RV) is less than epsilon, indicating that the step between the presently determined TV (and RV) is less than a value of epsilon so the determined value is highly accurate, such that a resultant is thereby determined at 190 due to the outcome 171.

It will be understood by those in the field that preferably a TV (test value), and hence an RV (intermediate resultant value), is an input that may be predetermined in accordance with a predefined process such that a TV, and hence an RV, are of a value that is the result of the predefined process, method, formula, definition, algorithm, predetermined event or similar.

Figure 2:
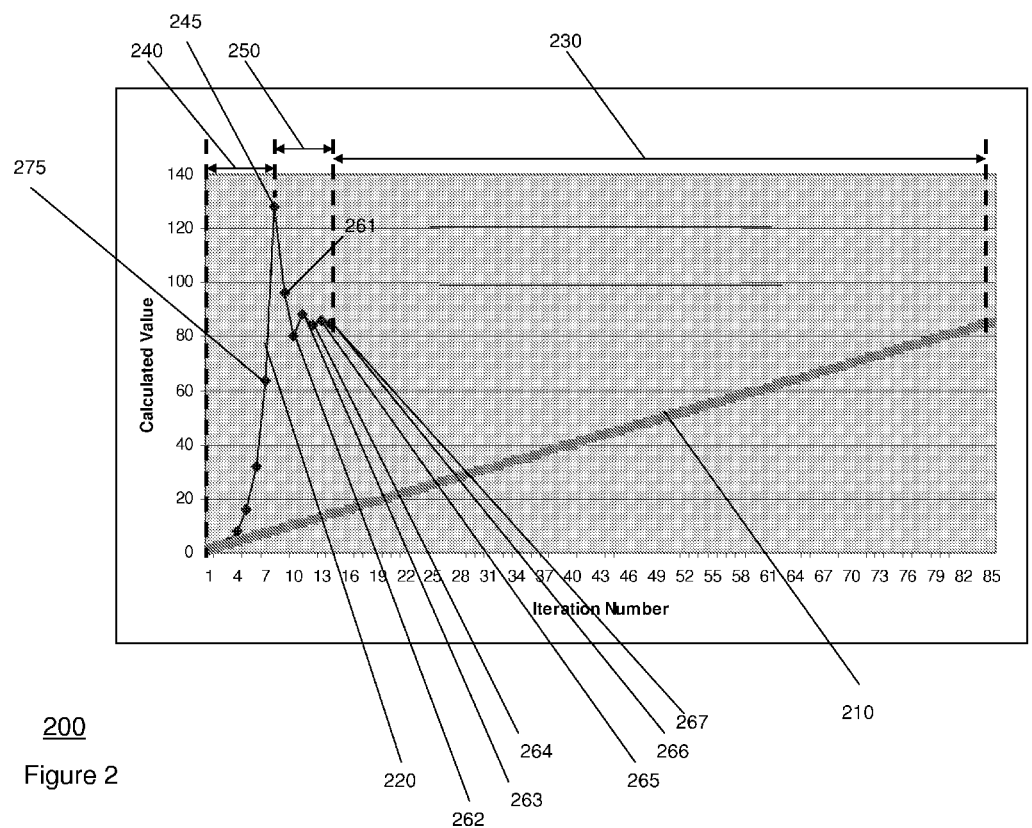
FIG. 2 is an exemplary depiction of a graphical resultant determination of the present invention when compared to a traditional interval-staged analysis.

FIG. 2 is an exemplary depiction 200 of a graphical resultant determination 220 of the present invention when compared to a traditional interval-staged analysis 210. From FIG. 2, the traditional interval analysis is depicted in one example at 210. The traditional analysis spans an interval range that approximates 85 iterative steps for a particular example. The method of the present invention in an implementation using identical performance parameters demonstrates an improved result is a lesser period of time at the iteration number is approximately 14. Comparatively then, the iterative steps saved as well as the time saved is graphically depicted as the spread at 230.

In FIG. 2, by example, $LV_I$=1, SS=1, and the LF=2. In this exemplified process, the exponential process of the present invention is undertaken at 240 and the binary process of the present invention occurs at 250.

From FIG. 2, the exponential process is performed over the intervals of 240 until the TV, and hence its respective RV, is determined to have failed the MPC check. The failed TV occurs in FIG. 2 at 245, where the TV is of a value of 128, and is comparatively and procedurally represented in FIG. 1 at 139. Once the TV has failed, the binary process is initiated and is performed over the example interval at 250 in FIG. 2 and a binary TV is to be determined as is represented in FIG. 1 at 151.

For the example of FIG. 2, following 245, a new $TV_B$ is determined, along with its respective $RV_B$, in accordance with equation 3, where given:

$$(TV_B)=((TV_N)+(TV_{N-1}))/2,$$

such that $TV_B$=(128+64)/2, since the prior TV which did not exceed the MPC (i.e., $TV_{N-1}$) is 64, at 275, then:

$TV_B$=96 (shown at 261).

For the example of FIG. 2, the MPC is exceeded and equation 4a is determined to be false, such that the $TV_B$ along with its respective $RV_B$, fails the MPC check of 153 in FIG. 1, initiating path 155a of FIG. 1. Since equation 4a is false, equation 4b is initiated procedurally under its first portion and since ($RV_B$)>MPC, then:

TV=(96+64)/2=80, (shown at 262). A comparison with equation 4c, determines that the equation is false, so a binary resultant value is then determined. The test value along with its respective RV, is then determined to not exceed the predetermined MPC value but still cause equation 4a to be false. Since equation 4a is false, equation 4b is initiated procedurally under its second portion and since ($RV_B$)<MPC, then:

TV=(80+96)/2=88, (shown at 263). A comparison with equation 4c, determines that the equation is false, so a binary resultant value is then determined. The test value, along with its respective RV, is then determined and found to exceed the predetermined MPC value and causes equation 4a to be false. Since equation 4a is false, equation 4b is initiated procedurally under its first portion and since ($RV_B$)>MPC, then: TV=(88+80)/2=84, (shown at 264). A comparison with equation 4c, determines that the equation is false, so a binary resultant value is then determined. The test value along with its respective RV, which does not exceed the predetermined MPC value and causes equation 4a to be false. The process continues in the example of FIG. 2 as:

TV=(84+88)/2=86, (shown at 265). A comparison with equation 4c, determines that the equation is false, so a binary resultant value is then determined. The test value along with its respective RV: [equation 4a false; ($RV_B$)>MPC]

TV=(84+86)/2=85, (shown at 266). A comparison with equation 4c, determines that the equation is true (i.e., epsilon=1.0), so a binary resultant value is then determined to not be needed to be determined in view of path 194. From path 194, the result (190) is determined to be 85.

In a further implementation, the present invention may be further accelerated where an additional set of performance characteristics is defined to include an expected target value (ETV) and an acceleration percentage as a function of the ETV. In this implementation, an estimate is provided as an ETV and where a first series of test values are determined (e.g., at the repeated flow sequence of 136 to 138 to 141 in FIG. 1), an accelerated test value $TV_N$ may be determined at 141 in accordance with:

$$(TV_N)=(LV_I)\cdot LF; \text{ where,} \quad (2)$$

$$LF=LF^2 \text{ if } (TV_{N-1})/(ETV)<\text{acceleration percentage, or} \quad (5)$$

$$LF=LF \text{ if } (TV_{N-1})/(ETV)> \text{ or =acceleration percentage.} \quad (6)$$

In a further implementation, the present invention is suited for a performance engineering environment where TV corresponds to the overall throughout of an environment and RV is defined as a set of values. For example provided a load-bearing input for one or more systems of equations, the present invention would provide for determining the utilization of multiple different systems or characteristics in this environment, where, for example, each system or characteristic in an RV could correspond to a CPU utilization amount for each system, or memory utilization, or similar resource utilization. In such an implementation, the MPCs may be related to or limiting constraints on CPU, memory, or other similar resource utilizations for each system. Further, it may be beneficial in this example for each RV to be assessed with a different MPC.

In this implementation a dramatic increase in the test value results thereby reducing the iterations required to accelerate the test value to approach or possibly exceed an ETV and thereby facilitate the process into the binary process portion.

For example an acceleration percentage may be of a value within a range of 50% to 99%, for a particular analysis, although the value of an acceleration percentage may range anywhere from 0% to 100%.

The method, computer program product, and system of the present invention may also include embodiments for viewing an electronic representation of graphics and text of intermediary results and final results of the process. The present invention may also be used as machine instructions for program code. As such, the present invention, in one implementation, may generally operate under control of a computer program product to provide the functionality described hereinabove in conjunction with the various components of the system, according to another aspect of the present invention. The computer program product includes a computer-readable storage medium, such as the non-volatile storage medium, and computer-readable program code portions, such as a series of computer instructions, embodied in the computer-readable storage medium.

The present invention is beneficial as it allows for a rapid ramp up of result estimates to rapidly target and identify a solution space in analytical methods even where a maximum value may be unknown. In preferred implementations of the present invention, the exponential process and the binary process portions are iterative and repeatedly determine and compare values and outcomes, in accordance with their respective methods and rule-based formulae.

The use of the term "formula" is intended to be inclusive of the term "rule" or "rule-based," where each are interchangeable herein, and where a formula is set forth to determine an outcome in relation to the variable and constraints of the formula which are directly related to the one or more rules associated with any formula.

As used herein, the term SS may also be used to interchangeably define the error value $\epsilon$ separately or simultaneously.

Additionally, as used herein the term MPC is intended to be inclusive of defined or predetermined performance characteristics related to the analysis. A MPC may be one or more maximum performance objectives or values that the analysis may not exceed. A MPC may be one or more guidelines for parameters, which may cause the analysis to overstep or be exceeded. A MPC may be determined directly, indirectly, or in relation to invariants for a process, which may be different for one or more invocations of a particular process or sub-process, and as such the notation of MPC may refer to one or more dependencies to a MPC. A MPC, for example, may include but not be limited to optimal value, error value, number of iterations, SS, positive sensing, negative sensing, etc.

In a particular implementation, it will be understood by those in the field that preferably a TV (test value), and hence an RV (intermediate resultant value), is an input that may be predetermined in accordance with a predefined process such that a TV, and hence an RV, are of a value that is the result of the predefined process, method, formula, definition, algorithm, predetermined event or similar. For instance, by way of example and not of limitation, a TV may be of a value that results from equation 1 above, or from a predefined step analysis, for example. A TV, and its related RV, may also be determined in direct relation to a predetermined MPC, provided a TV value is not defined as identical to the MPC value.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer program product for rapidly determining one or more resultant values in relation to one or more performance characteristics, the computer program product comprising a non-transitory computer-readable storage medium having computer-readable program code portions stored therein, the computer-readable program code portions are executed by a computer processor and comprising:

a first executable portion capable of, defining said one or more performance characteristics to include an initial load value ($LV_I$), at least one identified maximum performance constraint (MPC), an epsilon, a step size (SS), and a load factor (LF);

initiating a first process for (i) firstly determining and storing:

a first test value ($TV_I$), in a series of sequential test values in accordance with $TV_I = LV_I \cdot SS$, and an associated intermediate resultant value ($RV_I$), and (ii) calculating and storing one or more subsequent test values and their associated subsequent intermediate resultant values ($RV_N$), in accordance with $TV_N = TV_{N-1} \cdot LF$, where $TV_{N-1}$ is a prior sequential test value of a present test "N,"

until one of an intermediate resultant value or a subsequent intermediate resultant value associated with its respective test value or subsequent test value, exceeds at least one of said identified MPC; and, initiating a second process for (i) secondly determining and storing:

at least one binary test value ($TV_B$), in accordance with $TV_B = (TV_N + TV_{N-1})/2$, and an associated intermediate binary resultant value ($RV_B$), (ii) comparing said binary resultant value with at least said identified MPC in accordance with one or more predetermined rules; and (iii) determining a resultant value in relation to a binary test value, an associated binary resultant value, said identified MPC and at least said one or more predetermined rules.

2. The product of claim 1, wherein said one or more predetermined rules comprise:

if ($RV_B$)>MPC for at least one identified MPC, then ($TV_{BN+1}$)=(($TV_{BN}$)+($TV_H$)/2), or if ($RV_B$)<or=MPC for each of said MPCs, then ($TV_{BN+1}$)=(($TV_{BN}$)+($TV_L$)/2).

3. The product of claim 1, wherein said first process is an exponential process, said second process is a binary process, and one or more of said intermediate resultant values and said binary resultant value is a set of values.

4. A method for rapidly determining a resultant value in relation to one or more performance characteristics of a computer system, comprising:

initiating an exponential process using the computer system for calculating and storing one or more exponential test values and their associated intermediate resultant values until an associated intermediate resultant value exceeds at least one of said one or more performance characteristics;

initiating a binary process using the computer system for determining and storing one or more binary test values and their associated intermediate binary resultant values until a difference between a selected associated intermediate binary resultant value and at least one of said one or more performance characteristics is less than a predetermined value; and determining the resultant value to be the binary test value of the selected associated intermediate binary resultant value using the computer system.

5. The method of claim 4, wherein a first binary test value is determined in accordance with said associated intermediate resultant value that exceeds said at least one of said one or more performance characteristics.

6. The method of claim 4, further comprising comparing an associated intermediate binary resultant value with said one or more performance characteristics in accordance with one or more predetermined rules.

7. The method of claim 4, where said one or more performance characteristics further includes an expected target value, an optimal value, an error value, and an acceleration percentage as a function of said expected target value, and said exponential process further comprises adjustably defining a load factor to be equal to either the square of the load factor when a prior exponential test value divided by said expected test value is less than said acceleration percentage or the load factor when said prior exponential test value divided by said expected test value is greater than or equal to said acceleration percentage.

* * * * *